Aug. 24, 1937.                    E. OETIKER                    2,090,896
CLOSURE VALVE TO BE MOUNTED IN PIPES FOR HIGH PRESSURE GASES OR AIR
Filed March 12, 1936
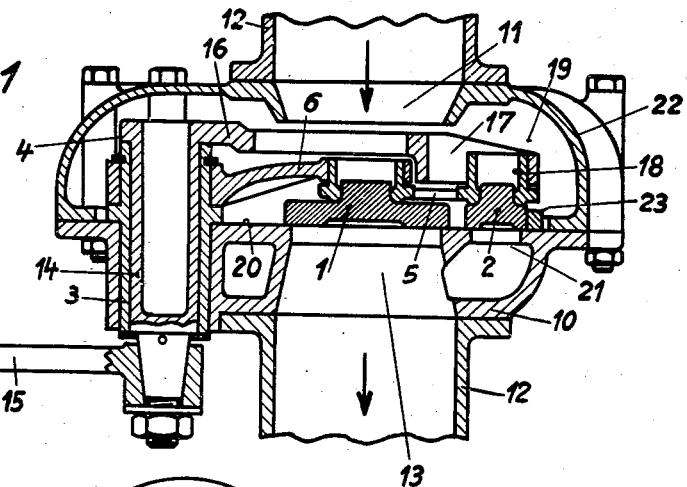
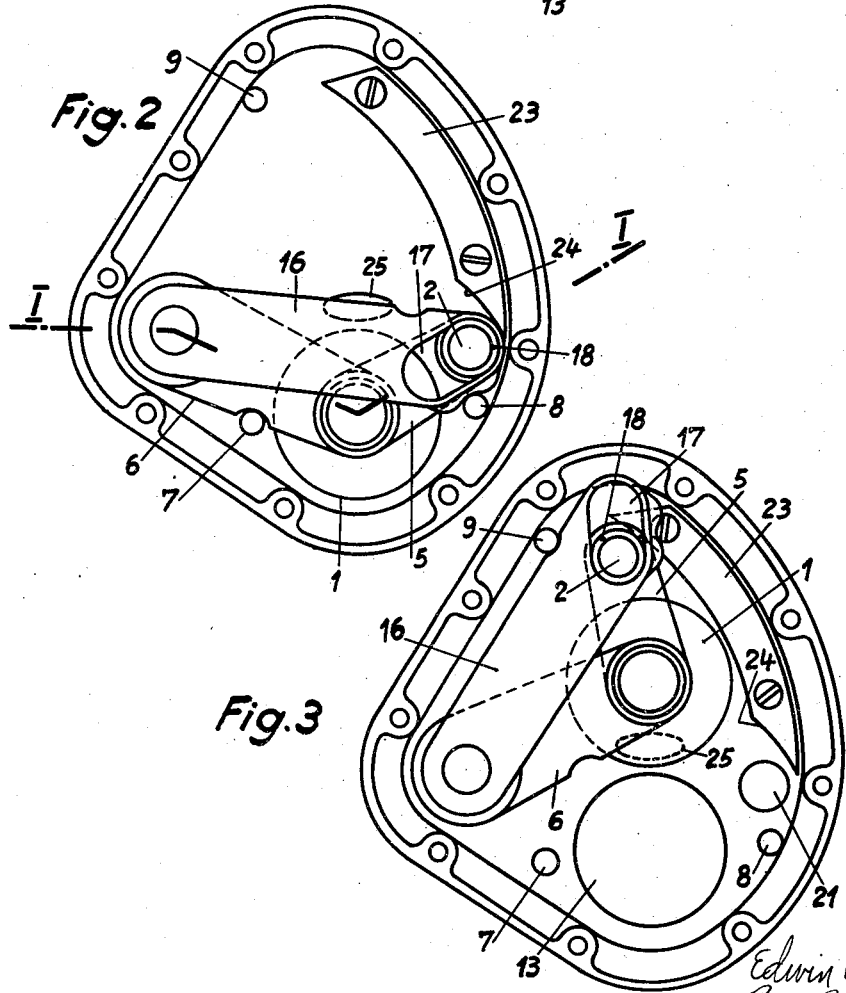
Inventor
Edwin Oetiker
By Bilinger, atty.

Patented Aug. 24, 1937

2,090,896

UNITED STATES PATENT OFFICE 2,090,896

CLOSURE VALVE TO BE MOUNTED IN PIPES FOR HIGH PRESSURE GASES OR AIR

Edwin Oetiker, Zurich-Altstetten, Switzerland

Application March 12, 1936, Serial No. 68,549
In Germany June 13, 1935

7 Claims. (Cl. 277—19)

The invention relates to a closure valve to be mounted in pipes for high pressure gases or air, which for example may be mounted in the exhaust pipe of engines in power vehicles, in pipes for compressed air brakes and so forth.

It has already been proposed to provide closure valves in exhaust pipes of engines which in addition to a main valve are also provided with an auxiliary valve. The auxiliary valve controls a gas bye-pass passage in such a manner that the bye-pass passage before the main valve is moved into the open position and that it only again closes the passage after the main valve has returned into the closed position. As a result the main valve can be moved without the expenditure of considerable force so that the pressure necessary for opening and closing the main valve, exerted by hand or foot, always remains low.

The object of the present invention is a simplified construction of such a closure valve and to obtain a rapid operation thereof, this being obtained according to the invention in that the two valves, the main valve and the auxiliary valve, which move on the same valve seating, are connected hingedly together and to a common pivot. An arm connected rigidly to the actuating shaft engages with the auxiliary valve which is guided and secured in a guide of the casing. When rocking the actuating shaft there is rocked the substantially smaller auxiliary valve for example before opening the main valve which is subjected to the gas pressure and is therefore difficult to move. The auxiliary valve rocks about the pivot of the link provided on the main valve. The bye-pass passage is thus opened and after opening the gas bye-pass the pressure on the main valve is reduced. Only after the main valve has been relieved of load is it moved by the arm of the actuating shaft and brought into the open position. The rocking of the main valve is thus effected after it has almost been relieved completely of load and thus without trouble. When closing the valve the main valve is moved first into its closing position; only then is the gas bye-pass closed by the auxiliary valve. The movement of the main valve into the closed position in the condition in which it is relieved of pressure.

The valves are preferably mounted loosely in the guiding and actuating arms and links so that they can adjust themselves automatically on the valve seat. The auxiliary valve itself is preferably allowed to roll on a guide bar of the valve casing.

In the accompanying drawing is shown by way of example a form of construction of a closing valve mounted in the exhaust pipe of vehicle engine.

Fig. 1 is an axial section.

Fig. 2 shows the open valve casing with the valves in the closed position.

Fig. 3 shows the valve casing with the valves in the open position.

In the casing 10, 22, connected by an inlet port 11 to the exhaust pipe 12 and provided with an outflow port 13, is mounted gastight an actuating shaft 14 by means of a packing gland 4. The actuating shaft 14 carries a lever 15 connected to an actuating pedal, etc. Further there is secured to the actuating shaft 14 an actuating arm 16 located in the interior of the casing 10. The arm 16 is provided with a slot 17. The latter is so located in the lever 16 that when the valves are in the closed position it is directed radially to the centre of the valve 1. Into the slot 17 there projects loosely movable, a bush 18, in which there is loosely rotatable one pivot of the auxiliary valve 2. The latter moves over the valve seat 20. The auxiliary valve 2 controls a bye-pass passage 21 which connects the interior 19 of the casing 10, 22 to the outflow pipe 13. On the seat 20 there also moves the main valve 1. This is connected hingedly by means of links 5, 6 to the auxiliary valve 2 and to a bush 3 forming a bearing for the actuating shaft 14. When turning the actuating shaft 14 there is first moved the auxiliary valve which is smaller and opposes less resistance to movement. The auxiliary valve or the link 5 then moves therewith the main valve 1 so that this opens or closes the main through-flow passage of the gas through the casing 10, 22. The auxiliary valve is round and is mounted rotatably in the bush 18. It moves along a guide bar 23 secured to the casing bottom 10. The guide bar is provided with a projection 24 against which the auxiliary valve bears when it, and also the main valve, is in the closed position. When opening the gas passage the auxiliary valve is first moved along the projection 24 when rocking the actuating arm 16 and is then set radially relatively to the actuating shaft against the wall of the projection. Then the auxiliary valve leaves the projection. The links 5, 6 are caused to collapse. After the auxiliary valve has exposed the bye-pass 21 it moves with it the main valve 1.

For the valves 1 and 2 stops 7, 8, 9 are provided in the casing which determine the end positions of the valves. The main valve is also mounted loosely in the links 5, 6. It can adjust itself automatically on the valve seat 20.

It is essential to mount all the movable parts, such as levers and so forth, on the casing bottom 10, whilst the casing cover 22 solely serves as a closure. It is thus possible to obtain a considerably simpler and more accurate setting of the above-mentioned parts.

In order to enable the valve mechanism to be used also for transferring compressed air to a storage tank for the purpose of actuating the vehicle brakes there is provided in the casing a further passage 25, terminating in the valve seat 20, which is controlled by the main valve 1 in such a manner that after closing the outflow opening 13 this passage 25 is exposed so that the compressed air produced by the motor can flow directly to the compressed air tank.

What I claim is:—

1. In a valve mechanism, the combination comprising a main pressure valve and an auxiliary pressure relieving valve, a valve casing in which said valves are mounted, said casing having an inlet passage, an outlet passage, and a bye-passage between the inlet and outlet passages, the main valve controlling the outlet passage, the auxiliary valve controlling the bye-pass passage, said valves being arranged for movement in the same plane, a common actuating member for said valves, said valves being hingedly connected together and to said common actuating member, and an actuating arm rigidly connected to said actuating member, said arm engaging with said auxiliary valve, the arrangement being such that when said arm is rocked by the actuating member for closing the outflow passage the main valve moves first into its closed position to close the outflow passage, whereupon the auxiliary valve moves into its closed position to close the bye-pass passage, whilst when the arm is moved to effect opening of the valves, the auxiliary valve first exposes the bye-pass passage, whereupon the main valve is moved to expose the outflow passage.

2. In a valve mechanism according to claim 1, a guide bar in said casing said auxiliary valve being rotatably mounted in said actuating arm, said auxiliary valve rolling on said guide during its opening and closing movements.

3. In a valve mechanism according to claim 1, a common seat for said valves in said casing, a link operatively connecting the auxiliary valve to the main valve, and a second link connecting the main valve to the actuating member, said actuating arm having a slot therein said auxiliary valve being loosely mounted in the first mentioned link and in the slot, said main valve being loosely mounted in the two said links, the arrangement being such that the valves adjust themselves automatically on said seat.

4. In a valve mechanism according to claim 1, a valve seat in said casing, said bye-pass passage and said outflow passage terminating in said seat, said seat having a further passage therein said further passage being adapted to be controlled by said main valve, said passage being so located that when the outflow passage is closed by the main valve said further passage is exposed.

5. In a valve mechanism according to claim 1, wherein said casing is provided with a single passage for the actuating member, said passage being capable of being packed easily entirely gastight.

6. A valve mechanism, comprising a casing consisting of an upper part and a lower part, said upper part having an inlet port therein, said lower part having an outflow port and a bye-passage therein, a valve seat in said lower part, said outflow port and bye-pass terminating in said valve seat, a bearing passage in said lower part, a packing bush in said bearing passage, an actuating shaft mounted in said bush, actuating means connected to one end of said shaft, an actuating arm fixedly connected to said shaft and located in said casing, a guide bar on said valve seat, a projection on said guide bar, said actuating arm having a slot therein, a link hingedly connected to said shaft, a second link, a main valve loosely engaging said links at their adjacent ends, an auxiliary valve loosely engaging the other end of the second link and said slot, said auxiliary valve being adapted to be guided by said guide bar and projection during its movement by the actuating arm, the arrangement being such that when the actuating arm is moved in one direction the auxiliary valve first opens the bye-pass passage whereupon the main valve is opened, whilst when moving the actuating arm in the opposite direction the main valve is first closed whereupon the auxiliary valve is closed.

7. In a valve mechanism, the combination comprising a main pressure valve and an auxiliary pressure relieving valve, a valve casing in which said valves are mounted, said casing having an inlet passage, an outlet passage and a bye-pass passage between the inlet and outlet passages, the main valve controlling the outlet passage and the auxiliary valve controlling the bye-pass passage, said valves being arranged for movement in the same plane, a common actuating member for said valves, means hingedly connecting said valves together and to said common actuating member, an actuating arm connected to said actuating member and having a radial slot, a guide bar in said casing, said radial slot and said guide bar serving to guide said auxiliary valve, the arrangement being such as to determine the relative position of said valves and to ensure the opening of the auxiliary valve before the main valve during the opening movement of said valves and the closing of the auxiliary valve after the main valve during the closing movement of said valves.

EDWIN OETIKER.